Sept. 2, 1958        F. P. REEVES        2,850,067

CLAMP ON ANTI-SKID DEVICE

Filed March 15, 1957        2 Sheets-Sheet 1

Frank P. Reeves
INVENTOR.

BY
Attorneys

Sept. 2, 1958      F. P. REEVES      2,850,067
CLAMP ON ANTI-SKID DEVICE

Filed March 15, 1957      2 Sheets-Sheet 2

Frank P. Reeves
INVENTOR.

BY

United States Patent Office 2,850,067
Patented Sept. 2, 1958

2,850,067

CLAMP ON ANTI-SKID DEVICE

Frank P. Reeves, Great Barrington, Mass.

Application March 15, 1957, Serial No. 646,233

3 Claims. (Cl. 152—213)

This invention relates to anti-skid devices and more particularly to an anti-skid device which is capable of being applied to the motor vehicle without jacking the wheels off the ground.

An object of the invention is to provide a mechanical anti-skid device which is much easier to apply than ordinary conventional chains, making it wholly unnecessary to jack up the wheel or to cause the motor vehicle to roll forward or backward slight distances while pulling, pushing or tugging the anti-skid device in order to try to attach it.

A more specific object of the invention is to provide an anti-skid device for each driving wheel of a motor vehicle, the device being made in two sections which are capable of being hingedly moved with respect to each other and which are mechanically related so that one section may be applied onto the tire beneath the fender of the motor vehicle and then the other section swung to a position where the tread engaging members will fit under the tire in front of and behind respectively the area of contact of the tire with the pavement or other supporting surface for the motor vehicle. Thereafter the anti-skid device is capable of being latched in place and at the same time adjusted to suit the size of the motor vehicle tire.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
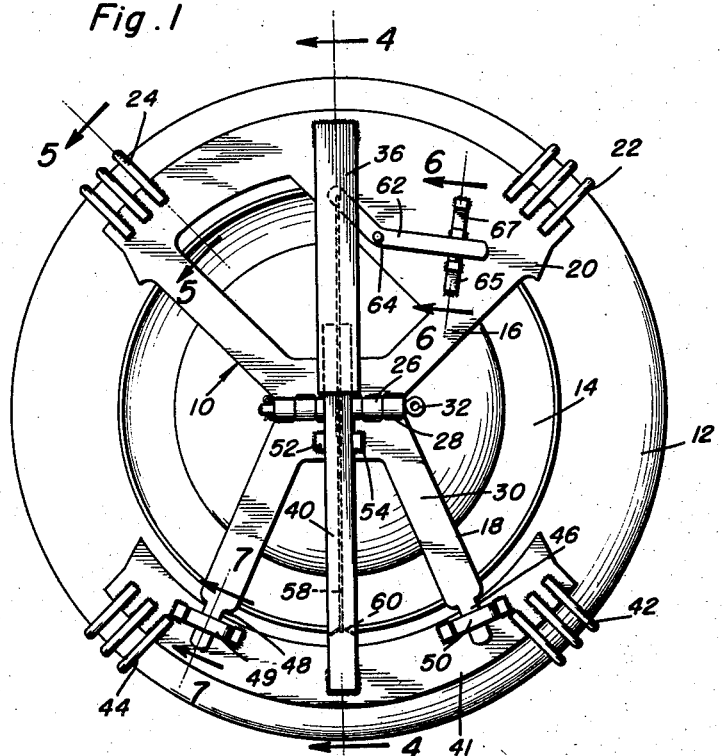
Figure 1 is an elevational view of an anti-skid device which is constructed in accordance with the invention showing the same applied to the wheel of a motor vehicle.
Figure 2:
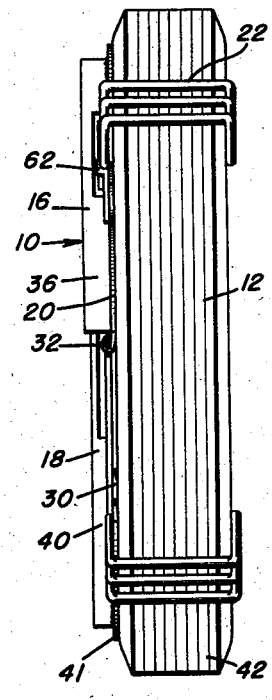
Figure 2 is a side view of the device in Figure 1 and on the same tire of the wheel thereof.
Figure 3:
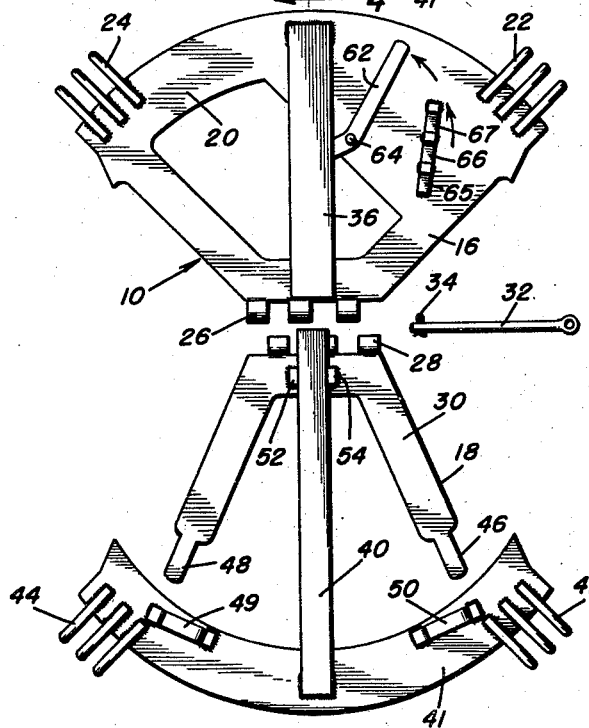
Figure 3 is an exploded elevational view of the parts in the anti-skid device of Figure 1.
Figure 4:
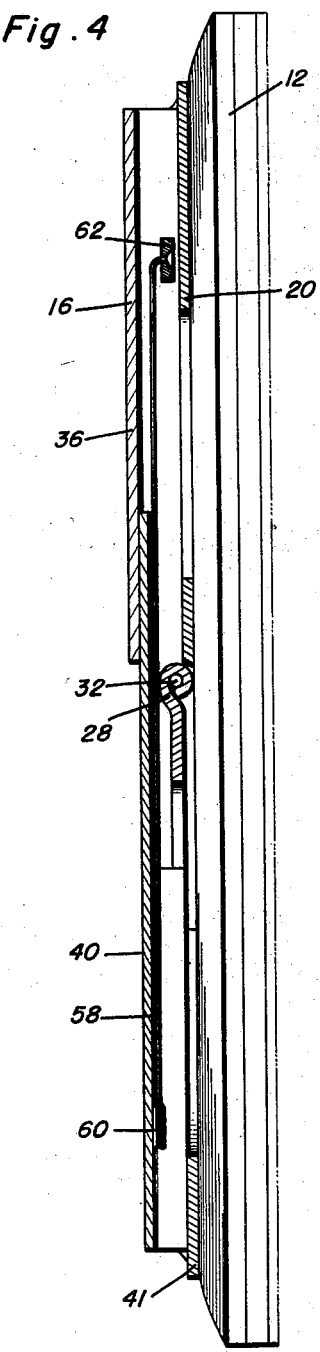
Figure 4 is a sectional view taken on the line 4—4 of Figure 1 and on an enlarged scale.
Figure 5:
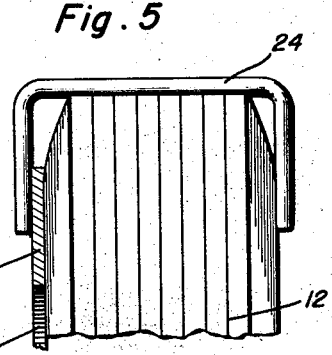
Figure 5 is an enlarged fragmentary sectional view taken on the line 5—5 of Figure 1.
Figure 6:
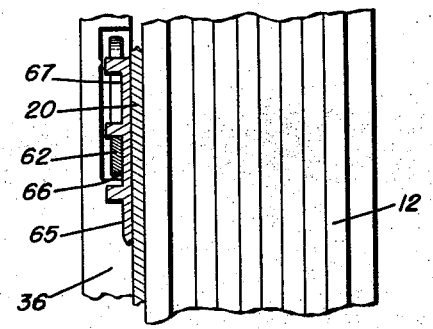
Figure 6 is a fragmentary sectional view in an enlarged scale and taken on the line 6—6 of Figure 1.
Figures 7, 8:
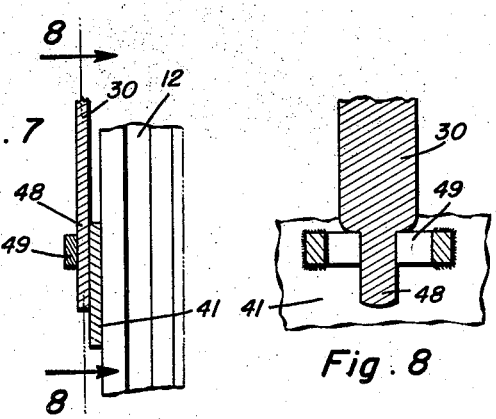
Figure 7 is an enlarged fragmentary sectional view taken on the line 7—7 of Figure 1.
Figure 8 is a sectional view taken on the line 8—8 of Figure 7.

In the accompanying drawings there is an anti-skid device 10 which is constructed in accordance with the principles of the invention. This device is shown on a tire 12 of a motor vehicle wheel 14, the tire and wheel being typical of any size found on motor vehicles. The anti-skid device 10 is constructed of two sections 16 and 18 respectively. The section 16 is made of a flat metal plate 20 with two groups 22 and 24 of tread engaging members. Although three such members are shown in each group, it is understood that this number may be increased or decreased depending on optium conditions. Each tread engaging member is made of a rather rigid bar that is U-shaped. The outer sides of each member are welded or otherwise attached to the plate 20 while the intermediate portions of each extend transversely across the tread of tire 12 and the other sides of each of the U-shaped members embrace the inner side wall of tire 12. The groups 22 and 24 of members are spaced from each other approximately 90°.

A group of hinge butts 26 are attached to the inner part of plate 20 and they are interdigitated with a group 28 of hinge butts on the plate 30 of section 18. Hinge pin 32 is adapted to be passed through the hinge butts 26 and 28 and a cotter key 34 at an end thereof prevents it from being inadvertently separated. An inwardly opening channel 36 is welded at its upper end to the outer surface of plate 20 and has an open lower end in which channel 40 is slidable. The two channels are telescopingly related to each other and function as a guide for the sections 16 and 18.

Section 18 is constructed of plate 30 and plate 41 on which groups 42 and 44 of tread engaging members are fixed. The groups 42 and 44 are identical in function and construction to groups 22 and 24 of tread engaging members on section 16. Plate 30 has two bars 46 and 48 extending from the ends thereof and they are adapted to fit in the passageway enclosed by straps 49 and 50 which are welded or otherwise formed on plate 41. Channel 40 is welded to plate 41 and is passed between the pair of fixed guides 52 and 54 that are welded or otherwise secured on the front surface of plate 30.

A flexible cable 58 is attached at one end to a hook 60 on guide channel 40 and is attached at the other end to a lever 62 which is mounted on a pivot 64 carried by plate 20. The hand receiving end of the lever is adapted to seat within a selective notch 65, 66 and 67 formed on the surface of plate 20.

In use and operation, the anti-skid device may be applied to the motor vehicle and taken off in a few seconds without jacking up the wheels of the car. The first step is to separate the two sections so that the lower section may be moved pivotally upwardly toward the upper section, into a jackknifed position. Then, the tire tread engaging members 22 and 24 of the upper section should be engaged about the tire. It will be necessary to slide these members 22 and 24 up behind the fender, between the fender and the tire. The lower section may then be engaged in place, by having the lower tire engaging members 42 and 44 engaged over the tire at either side of the tire at the point of contact with the road surface. Then, the two sections may be pulled together by rotating the lever 62 about its pivot 64, so that cable 58 will tighten the two sections together and cause the two channels 40 and 36 to telescope within each other, and the lever 62 may then be inserted into one of the proper notches 65, 66 or 67.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an anti-skid device for a motor vehicle wheel which is capable of being applied to the motor vehicle without lifting the vehicle wheel from the ground, said anti-skid device comprising a first rigid section, a second rigid section, means hingedly connecting said sections together, said second section including a first part which is hinged to said first section and another part, means movably connecting said other part to said first part of said second section, said another part having tread contacting members, and means for pulling said another part tightly toward said first section so that the tread contacting members on said another part and on said first section firmly grip the tread of the tire.

2. In an anti-skid device for a motor vehicle wheel which is capable of being applied to the motor vehicle without lifting the vehicle wheel from the ground, said anti-skid device comprising a first rigid section, a second rigid section, means hingedly connecting said sections together, said second section including a first part which is hinged to said first section and another part, means movably connecting said other part to said first part of said second section, said another part having tread contacting members, and means for pulling said another part tightly toward said first section so that the tread contacting members on said another part and on said first section firmly grip the tread of the tire, means operatively connected to said another part and to first section for guiding said another part with respect to said first section and for preventing said another part from cocking with respect to said first section.

3. The anti-skid device of claim 2 wherein said guiding means comprises a member secured to said first section, another member secured to said another part and telescopingly connected with said first member.

References Cited in the file of this patent

UNITED STATES PATENTS

| | | |
|---|---|---|
| 2,252,027 | Pasquarella | Aug. 12, 1941 |
| 2,638,140 | Paulsen | May 12, 1953 |
| 2,657,728 | Jackson | Nov. 3, 1953 |